J. C. BONNER.
HOISTING MECHANISM.
APPLICATION FILED MAR. 29, 1918.
1,358,512.
Patented Nov. 9, 1920.
3 SHEETS—SHEET 2.
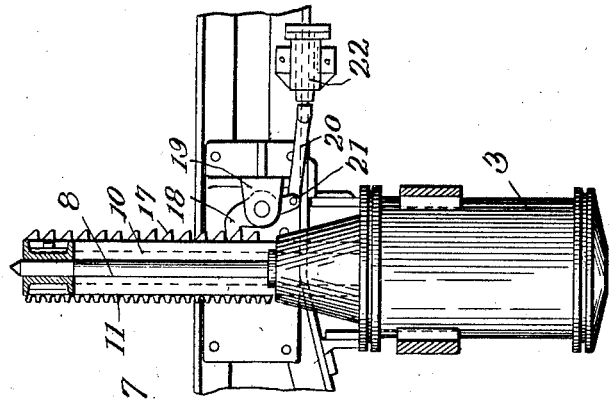
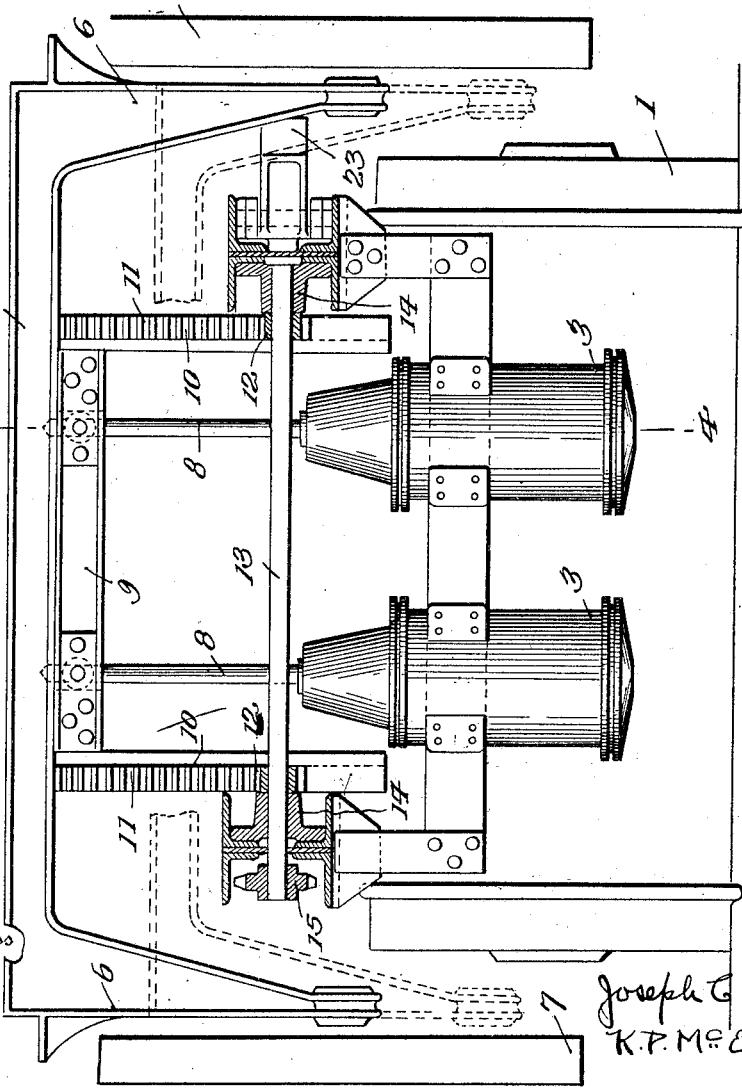

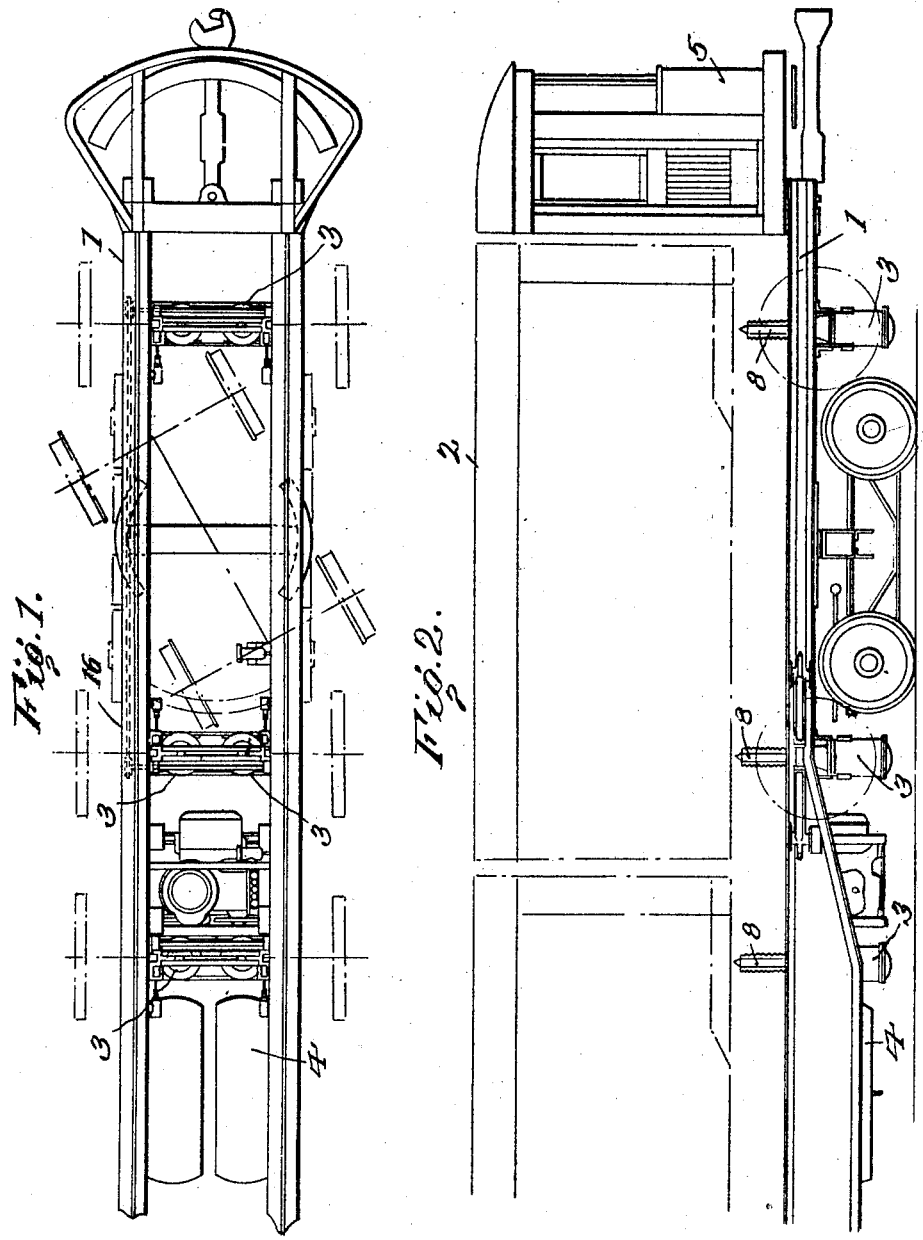

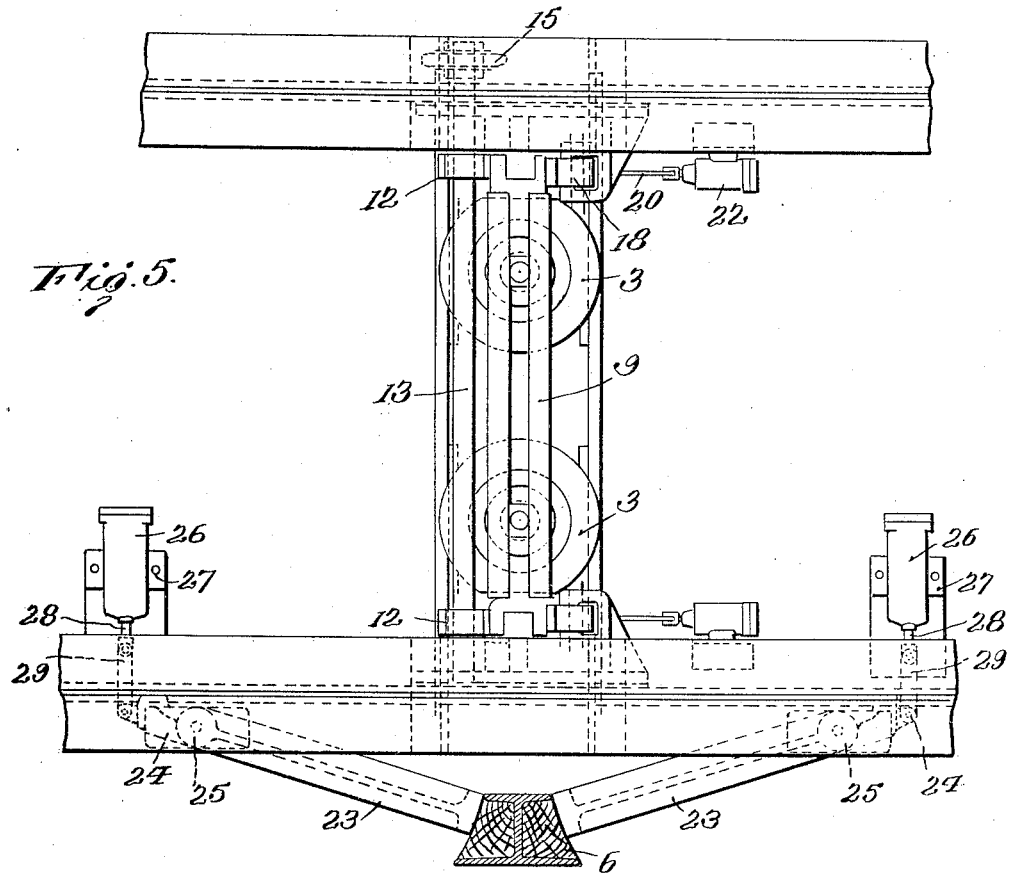
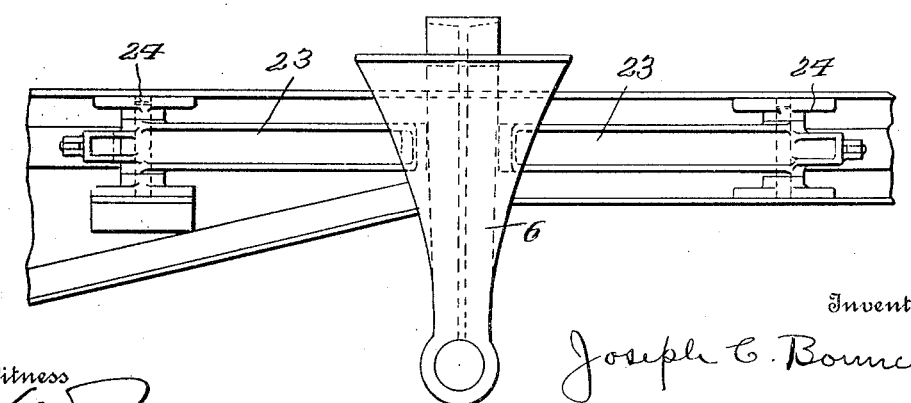

UNITED STATES PATENT OFFICE.

JOSEPH C. BONNER, OF TOLEDO, OHIO.

HOISTING MECHANISM.

1,358,512.   Specification of Letters Patent.   Patented Nov. 9, 1920.

Application filed March 29, 1918. Serial No. 225,576.

*To all whom it may concern:*

Be it known that I, JOSEPH C. BONNER, a citizen of the United States, residing at Toledo, in the county of Lucas and State of Ohio, have invented certain new and useful Improvements in Hoisting Mechanisms, of which the following is a specification.

This invention relates to hoisting mechanisms; and it comprises the combination of two complementary vehicles, one of said vehicles adapted to straddle the other, means for elevating the carried vehicle with respect to the carrying vehicle, means for locking the elevating mechanism, and means carried by one of the vehicles and adapted to engage the other vehicle to hold them in proper longitudinal adjustment, said elevating and securing means comprising a plurality of pneumatic jacks, best arranged in pairs, each of said jacks comprising a cylinder, a piston in the cylinder and a piston rod connected to the piston, and a yoke secured to the piston rods of each pair of jacks, an equalizing shaft for each pair of jacks, means for revolving the shaft when the jacks are actuated, means for connecting the equalizing shaft of one pair of jacks with the equalizing shaft of another pair of jacks, and means carried by one of the vehicles for engaging the other vehicle when the two vehicles are in proper longitudinal positions; all as more fully hereinafter set forth and as claimed.

In a copending application Serial No. 867,865, filed April 21, 1914, I have described and claimed a transportation system comprising two complementary vehicles, one of which is adapted to straddle the other, and in which the carrying vehicle is provided with means for elevating the carried vehicle to raise its wheel treads from the ground, and additional means for supporting the carried vehicle in raised position. The system consists of a carried vehicle, which may be termed a road wagon, and a carrying vehicle or freight car, upon which the road wagon may be loaded. The use of the system eliminates the frequent loading of merchandise necessary in the present methods of transportation. In the present application I do not claim this transportation system comprising two or more complementary vehicles, and I do not broadly claim the means for elevating the carried vehicle and securing it in elevated position, but I do claim the improved construction hereinafter set forth and defined in the appended claims.

In elevating the carried vehicle, which I sometimes call a road wagon, pneumatic jacks may be employed, and I generally employ a plurality of jacks to constitute one set of elevating apparatus. If the load in the carried vehicle is unevenly distributed, one or more of the jacks must lift more than its share of the load. In the present invention I have devised a method of arranging the jacks in pairs or units, and connecting each pair of jacks or unit, so that they work in unison and properly distribute the load. I have further devised a method of equalizing the load between two or more of such units constituting a set of hoisting mechanism. In constructing the carrying vehicles, which may be freight cars, and which I will for convenience refer to as freight cars, it is necessary to arrange the sets of the hoisting mechanism in proper position for the size of the road wagon to be employed therewith. A single freight car may carry one or more road wagons, and in loading the wagons on the freight car it is necessary to properly position them with respect to the sets of loading mechanism. I have therefore devised a method of stopping the road wagon when it has assumed the proper position for elevation.

In the present invention I employ lifting means in the nature of pneumatic jacks, the jacks being arranged in pairs or units, the two jacks constituting each unit being connected by a yoke or the like to cause them to operate in unison and being provided with means for holding them in elevated position when raised. I have further provided means for equalizing the load upon the separate units constituting a single set, said means comprising an equalizing shaft for each unit and means for connecting said shafts. The carrying vehicle is provided with means for engaging the carried vehicle when the two vehicles are in proper longitudinal alinement, the said means comprising pivoted chocks carried on the frame work of the carrying vehicle or freight car and adapted to engage the carried vehicle.

In the accompanying drawings I have shown an advantageous embodiment of this invention.

In this showing Figure 1 is a diagrammatic plan view of a freight car showing the elevating mechanism, the wheels of the road wagon being illustrated in dotted lines, Fig. 2 is a side elevation of the construction shown in Fig. 1, the wheels and body of the carried vehicle being in dotted lines, Fig. 3 is an end elevation of the two vehicles with the carried vehicle astride the carrying vehicle, showing the elevating mechanism, Fig. 4 is a vertical sectional view on line 4—4 of Fig. 3, Fig. 5 is a plan view of the lifting mechanism and chock showing a portion of the carried vehicle in section, and Fig. 6 is a side elevation of Fig. 5.

Referring to Figs. 1 and 2 of the drawing the reference numeral 1 indicates generally a freight car and 2 indicates a road wagon of the type shown in my copending application, Serial 867,865, filed April 21, 1914. Hoisting mechanism comprising pneumatic jacks 3 which, as shown, are arranged in pairs is employed for elevating the road wagon. Each pair of jacks constitutes what may be termed a unit. Two or more jacks may constitute a unit. Two units are employed to constitute a single set of elevating means, each unit being advantageously positioned near one end of the carried vehicle. The jacks are operated by compressed air furnished from the cylinders 4. Any means may be employed for connecting the compressed air cylinders with the jacks and any type of controlling valves may be used. The controlling valves (not shown) may be conveniently positioned in the cab 5 and the jacks and the chock may be operated from the cab.

In Fig. 3 of the drawings, I have shown the detail construction of the lifting mechanism. In this view I have illustrated one pair or unit of the lifting jacks, the road wagon being shown in elevated position on the freight car. As described in my copending application the road wagon is provided with depending supports 6 which carry the wheels 7 thereby providing a clearance space beneath the body of the vehicle which permits the two vehicles to be brought into proper position with the freight car beneath the body of the road wagon. The road wagon is indicated in lowered position in dotted lines. Each jack comprises a cylinder which is connected to one of the air cylinders 4 by any suitable means (not shown) and is provided with an exhaust outlet. Suitable valves are provided for controlling the inlet and exhaust of air or other pressure medium. A piston (not shown) is arranged in each cylinder and is provided with piston rod 8 which is raised when the air is admitted to the cylinder. The piston rods are connected by yokes 9 having vertical arms 10. Rack teeth 11 are arranged on the vertical arms and mesh with pinions 12 carried on equalizing shaft 13. Equalizing shaft 13 is mounted in suitable bearings 14 on the frame of the car and carries a sprocket 15. One equalizing shaft is provided for each unit and the two equalizing shafts on each set are connected by chain 16 (shown in dotted lines in Fig. 1) passing over the sprockets.

In Fig. 4 of the drawings I have shown means for securing the yokes in elevated position. When the yokes have been elevated it is advantageous to have additional means for securing them in this position. In the absence of such means it will be necessary to maintain pressure in the jacks 3 and the jacks will be compelled to support the weight of the road wagons and would thereby be placed under an unnecessary strain. As shown in Fig. 4, the vertical arms of the yokes are provided with ratchet teeth 17. Dog 18 is mounted in a bracket 19 carried on the frame work of the car and is adapted to engage one of said ratchet teeth. Means are provided for disengaging the dog when the yokes are to be lowered. As shown, the connecting link 20 is pivoted to the dog at 21 and connected to a piston operating in air cylinder 22.

In Figs. 5 and 6 of the drawings, I have shown the chock or means for holding the road wagon in proper longitudinal position with respect to the car. Pivoted arms 23 are arranged on the frame work of the car, the arms being pivoted in brackets 24 and normally held in outward position by springs (not shown). As shown, the arms are adapted to engage the depending support of the road wagon wheels. Means are provided for releasing the arms and causing them to assume an inoperative position. As shown, air cylinders 26 are mounted in brackets 27 on the frame of the machine and provided with piston rods 28. Links 29 are connected to the piston rods and to the ends of the pivoted chock arms.

In operation, when a road wagon is to be loaded on to the car the chocks 23 are brought into inoperative position. This is accomplished by supplying air to cylinders 26 forcing a piston rod 28 to move outwardly. The end of the chock lever which is connected to the piston rod by link 29, will be forced outwardly causing the other end to move in the opposite direction. Air pressure is maintained in cylinders 26 until the front wheels of the road wagon have passed the chock members, and then the air is released. The chock members are forced into the position shown in Figs. 5 and 6 by the pressure of the springs. When the wagon is moved in the proper position, the levers 23 will engage the depending member 6 preventing further movement of the road vehicle. Air is then supplied to the pneumatic jacks 3 causing the piston and piston rods 8 to be raised. Yoke 9, being connected to the piston rods of each unit of pneumatic jacks, causes the jacks to work in unison and causes equal distribution of the load. Rack 11 revolves pinion 12 on equalizing shaft 13 and the two equalizing shafts are caused to revolve together through chain 16. The provision of equalizing shafts distributes the load to the units which form a single set of hoisting mechanism. When the road wagon has been elevated to the proper position, the air is released from cylinders 3 and the wagon is maintained in elevated position by dog 18 which engages ratchet teeth 17 carried by the yoke. When the road wagon is to be removed from the car, air is admitted to cylinders 3, and also to cylinder 22. The air in cylinder 22 moves the dog 18 out of engagement with ratchet teeth 17. The air is then slowly exhausted from cylinders 3. The pistons in cylinders 3 and piston rods 8 move toward the lower end of the cylinders. The weight of the wagon forces the piston down in the cylinder, and the air is slowly exhausted from the cylinder to prevent the wagon from being lowered too rapidly. The road wagon will thus be lowered until its wheels engage the ground and it is in position to be run off the car. Air is then admitted to cylinders 26 to release the chocks 23. When the chocks have been released, the road wagon may be run off the car, or the car may be drawn from under the wagon.

In the accompanying drawings, I have illustrated the hoisting mechanism as comprising four pneumatic jacks to a set, each pair forming a single unit, but it is evident that a greater or less number of jacks may be employed to form a set of hoisting mechanism, and that a single jack or more than two jacks may be employed in each unit of the set.

The arrangement of the connecting pipes and valves for controlling the supply of air to the cylinders is not shown as any suitable arrangement may be employed. It is convenient to arrange the control valves in the operator's cab of the car, and where the freight train comprises several cars, only one of which is provided with an operator's cab, it is convenient to arrange the valves of all of the operating mechanisms in the cab.

What I claim is:

1. In combination with a pair of complementary vehicles, one of which is adapted to carry the other, the carried vehicle being provided with depending supports to permit it to straddle the carrying vehicle and rest thereon with the axes of its wheels below the horizontal plane of engagement, means for positioning said carried vehicle with respect to the carrying vehicle, said means comprising pivoted members arranged on the carrying vehicle and adapted to engage the carried vehicle, means for normally maintaining said pivoted members in operative position, and means for moving said pivoted members to inoperative position.

2. The combination with a railway flat car and a road wagon, one of which is adapted to carry the other, the road wagon being provided with depending supports to permit it to straddle the car and rest thereon, with the axes of its wheels below the horizontal plane of engagement, means for elevating the road wagon with respect to the car, said elevating means comprising a plurality of elevating devices arranged in units, and a yoke connecting the lifting devices of each unit to cause equal distribution of the load.

3. The combination with a railway flat car and a road wagon, one of which is adapted to carry the other, the road wagon being provided with depending supports to permit it to straddle the car and rest thereon, with the axes of its wheels below the horizontal plane of engagement, means for elevating the road wagon with respect to the car, said elevating means comprising a plurality of elevating devices arranged in units, means for causing the elevating devices of a unit to operate in unison, and means for holding the carried vehicle in elevated position.

4. In combination with a pair of complementary vehicles, one of which is adapted to carry the other, the carried vehicle being provided with depending supports to permit it to straddle the carrying vehicle and rest thereon with the axes of its wheels below the horizontal plane of engagement, means for positioning said carried vehicle with respect to the carrying vehicle, said means comprising pivoted members arranged on the carrying vehicle and adapted to engage one of said depending wheel supports on the carried vehicle, and means for moving said pivoted members to inoperative position.

5. In combination with a pair of complementary vehicles, one of which is adapted to carry the other, the carried vehicle being provided with depending supports to permit it to straddle the carrying vehicle and rest thereon with the axes of its wheels below the horizontal plane of engagement, means for elevating the carried vehicle with respect to the carrying vehicle, said elevating means comprising a plurality of pneumatic jacks arranged in units, and yokes connecting the jacks forming each unit to cause equal distribution of the load.

6. In combination with a pair of complementary vehicles, one of which is adapted to carry the other, the carried vehicle being provided with depending supports to permit it to straddle the carrying vehicle and rest thereon with the axes of its wheels below the horizontal plane of engagement, means for elevating the carried vehicle with respect to the carrying vehicle, said means comprising a set of pneumatic jacks arranged in units, and means for connecting one unit to another to cause an equal distribution of the load.

7. In combination with a pair of complementary vehicles, one of which is adapted to carry the other, the carried vehicle being provided with depending supports to permit it to straddle the carrying vehicle and rest thereon with the axes of its wheels below the horizontal plane of engagement, means for elevating the carried vehicle with respect to the carrying vehicle, said means comprising a set of pneumatic jacks arranged in units, an equalizer shaft for each unit, and means for connecting said equalizer shafts whereby the load is distributed.

8. In combination with a pair of complementary vehicles, one of which is adapted to carry the other, the carried vehicle being provided with depending supports to permit it to straddle the carrying vehicle and rest thereon with the axes of its wheels below the horizontal plane of engagement, means for elevating the carried vehicle with respect to the carrying vehicle, said elevating means comprising a plurality of pneumatic jacks arranged in units, yokes connecting the jacks of each unit, said yokes being provided with rack teeth, an equalizer shaft arranged near each of said yokes, pinions on said equalizer shafts meshing with the rack teeth of the adjacent yokes, and means for connecting the equalizer shaft of one unit to the equalizer shaft of another unit.

In testimony whereof, I affix my signature hereto.

JOSEPH C. BONNER.